(12) United States Patent
Dai et al.

(10) Patent No.: US 9,716,529 B1
(45) Date of Patent: Jul. 25, 2017

(54) SYSTEMS AND METHODS TO ADAPTIVELY MITIGATE ELECTRO-MAGNETIC INTERFERENCE (EMI) IN AUTOMOTIVE AND INDUSTRIAL COMMUNICATION SYSTEMS

(71) Applicant: Marvell International Ltd., Hamilton (BM)

(72) Inventors: Shaoan Dai, San Jose, CA (US); Kok-Wui Cheong, Los Altos, CA (US); Zhenzhong Gu, San Jose, CA (US); Junqing Sun, Fremont, CA (US); Xing Wu, Palo Alto, CA (US)

(73) Assignee: Marvell Interntational LTD., Hamilton (BM)

( * ) Notice: Subject to any disclaimer, the term of this patent is extended or adjusted under 35 U.S.C. 154(b) by 0 days.

(21) Appl. No.: 15/164,391

(22) Filed: May 25, 2016

Related U.S. Application Data (60) Provisional application No. 62/183,842, filed on Jun. 24, 2015.

(51) Int. Cl.
*H03K 5/159* (2006.01)
*H04B 3/04* (2006.01)
(Continued)

(52) U.S. Cl.
CPC .................. *H04B 3/04* (2013.01); *H04B 3/23* (2013.01); *H04B 17/336* (2015.01); *H04L 25/03885* (2013.01); *H04L 25/085* (2013.01)

(58) Field of Classification Search
CPC ........ H04B 3/04; H04B 17/336; H04B 3/142; H04B 3/23; H04L 25/03885; H04L 25/085
(Continued)

(56) References Cited

U.S. PATENT DOCUMENTS 6,426,813 B1 * 7/2002 Swenson .............. G01R 31/001
324/627
7,542,528 B1 * 6/2009 Cheong .................... H04B 3/32
375/233
(Continued)

OTHER PUBLICATIONS

IEEE P802.3bw/D3.3 "Draft Standard for Ethernet Amendment: Physical Layer Specifications and Management Parameters for 100 Mb/s Operation over a Single Balanced Twisted Pair Cable (100BASE-T1);" LAN/MAN Standards Committee of the IEEE Computer Society; Aug. 21, 2015; 91 Pages.
(Continued)

*Primary Examiner* — Helene Tayong (57) ABSTRACT

A transceiver includes an equalizer, an adaptation module, an error detector, and a controller. The equalizer receives an input signal via the single twisted-pair Ethernet cable, including outputs of an analog front end of the receiver and an echo canceller, to cancel electromagnetic interference from the input signal. The adaptation module adapts parameters of one or more of i) the equalizer, ii) the analog front end, and iii) the echo canceller based on an error in an output of the equalizer due to the electromagnetic interference. The error detector detects when the error is greater than or equal to a predetermined threshold and in response sets an error indicator to indicate no error for a predetermined period of time. The controller controls adaptation of the parameters of the one or more of i) the equalizer, ii) the analog front end, and iii) the echo canceller based on the error indicator.

24 Claims, 7 Drawing Sheets

(51) Int. Cl.
 *H04B 3/23* (2006.01)
 *H04L 25/03* (2006.01)
 *H04L 25/08* (2006.01)
 *H04B 17/336* (2015.01)

(58) Field of Classification Search
 USPC ........................................ 375/232, 229, 230
 See application file for complete search history.

(56) References Cited

U.S. PATENT DOCUMENTS

| | | | |
|---|---|---|---|
| 8,315,301 B1* | 11/2012 | He | H04L 25/03057 375/233 |
| 8,331,508 B2* | 12/2012 | Dabiri | H03H 21/0021 375/278 |
| 8,792,597 B2* | 7/2014 | Malkin | H04B 3/30 370/285 |
| 2006/0182014 A1* | 8/2006 | Lusky | H04B 3/23 370/201 |
| 2007/0237270 A1* | 10/2007 | Mezer | H04B 3/23 375/346 |
| 2009/0245448 A1* | 10/2009 | Ran | H04L 25/03057 375/373 |

OTHER PUBLICATIONS

IEEE P802.3bp/D3.0 "Draft Standard for Ethernet Amendment: Physical Layer Specification and Management Parameters for 1 Gb/s Operation over a Single Twisted Pair Copper Cable;" LAN/MAN Standards Committee of the IEEE Computer Society; Dec. 15, 2015; 224 Pages.

* cited by examiner

SYSTEMS AND METHODS TO ADAPTIVELY MITIGATE ELECTRO-MAGNETIC INTERFERENCE (EMI) IN AUTOMOTIVE AND INDUSTRIAL COMMUNICATION SYSTEMS

CROSS-REFERENCE TO RELATED APPLICATIONS

This application claims the benefit of U.S. Provisional Application No. 62/183,842, filed on Jun. 24, 2015. The entire disclosure of the application referenced above is incorporated herein by reference.

This application is related to U.S. patent application Ser. No. 15/164,364, filed May 25, 2016.

FIELD

The present disclosure relates generally to communication systems and more particularly to systems and method for adaptively mitigating electromagnetic interference in communication systems used in automotive and industrial environments.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High-speed Ethernet-based communication systems designed for use in automotive and industrial environments (e.g., in vehicles and boats) differ in many respects from communication systems used in traditional consumer electronics (e.g., computers, computer networks, and home/office equipment). For example, the communication systems in automotive and industrial environments use only single twisted-pair-based Ethernet (i.e., fewer twisted-pairs than those used in traditional consumer electronics). Additionally, the communication systems in automotive and industrial environments experience different electromagnetic interference (EMI) than the interference experienced by the communication systems in traditional consumer electronics. For example, the communication systems in automotive and industrial environments can experience EMI from sources such as radars (e.g., from police vehicles, and airport control towers), lightening, power transmission and distribution lines, engine operation, which is not normally experienced by the communication systems used in traditional consumer electronics. The communication systems in automotive and industrial environments have tighter electromagnetic compatibility (EMC) requirements than the communication systems in traditional consumer electronics.

SUMMARY

A transceiver to communicate in a vehicle via a single twisted-pair Ethernet cable includes a transmitter to transmit signals via the single twisted-pair Ethernet cable and a receiver to receive signals via the single twisted-pair Ethernet cable. The transceiver comprises an equalizer, an adaptation module, an error detector, and a controller. The equalizer is configured to receive an input signal received by the transceiver via the single twisted-pair Ethernet cable and to cancel electromagnetic interference from the input signal. The input signal includes outputs of i) an analog front end of the receiver and ii) an echo canceller. The echo canceller is configured to cancel echo from the transmitter. The transmitter is collocated with the receiver. The adaptation module is configured to adapt parameters of one or more of i) the equalizer, ii) the analog front end, and iii) the echo canceller based on an error in an output of the equalizer due to the electromagnetic interference. The error detector is configured to detect when the error is greater than or equal to a predetermined threshold and in response to detecting that the error is greater than or equal to the predetermined threshold, the error detector is configured to set an error indicator to indicate no error for a predetermined period of time. The error indicator set to zero for the predetermined period of time indicates that no error has occurred for the predetermined period of time. The controller is configured to control adaptation of the parameters of the one or more of i) the equalizer, ii) the analog front end, and iii) the echo canceller based on the error indicator.

In other features, the controller does not adapt the parameters during the predetermined period of time in response to i) the error being greater than or equal to the predetermined threshold and ii) the error indicator indicating no error.

In other features, the parameters include i) a gain of the equalizer, ii) a timing of the analog front end, and iii) coefficients of the echo canceller.

In other features, the electromagnetic interference includes i) narrowband interference and ii) burst noise. The error is greater than or equal to the predetermined threshold due to the burst noise. The predetermined time period is based on a duration of the burst noise. The predetermined threshold is based on a strength of the burst noise.

In other features, the equalizer is further configured to generate a notch filter to cancel the electromagnetic interference. The electromagnetic interference includes narrowband interference. The transceiver further comprises a signal-to-noise ratio estimator configured to estimate a signal-to-noise ratio based on the output of the equalizer. The controller is further configured to control a rate of generation of the notch filter by the equalizer based on the signal-to-noise ratio.

In other features, the rate of generating the notch filter is inversely related to the signal-to-noise ratio.

In other features, the controller is further configured to increase the rate of generation of the notch filter in response to the signal-to-noise ratio being less than or equal to a predetermined value.

In other features, the controller is further configured to decrease a rate of adaptation of the parameters to less than a predetermined rate.

In other features, the controller is further configured to i) increase the rate of generation of the notch filter and ii) decrease the rate of adaptation of the parameters in response to the error being less than the predetermined threshold after the predetermined time period.

In other features, the input signal is a combination of i) a first signal received by the receiver via the single twisted-pair Ethernet cable and ii) an echo cancellation signal from the echo canceller associated with the transmitter.

In other features, the equalizer is a feedforward equalizer including a notch filter. The notch filter is a finite impulse response filter. A number of taps of the notch filter is based on a frequency of the electromagnetic interference to be mitigated.

In other features, the transceiver further comprises a decision feedback equalizer, a slicer, and a forward error correcting decoder. The decision feedback equalizer includes an infinite impulse response filter configured to receive the output of the equalizer. The slicer is configured to slice an output of the decision feedback equalizer. The forward error correcting decoder is configured to decode an output of the slicer.

In still other features, a transceiver to communicate in a vehicle via a single twisted-pair Ethernet cable includes a transmitter to transmit signals via the single twisted-pair Ethernet cable and a receiver to receive signals via the single twisted-pair Ethernet cable. The transceiver comprises an equalizer, a signal-to-noise ratio estimator, and a controller. The equalizer is configured to receive an input signal received by the transceiver via the single twisted-pair Ethernet cable and to cancel electromagnetic interference from the input signal. The input signal includes outputs of i) an analog front end of the receiver and ii) an echo canceller. The echo canceller is configured to cancel echo from the transmitter. The transmitter is collocated with the receiver. The signal-to-noise ratio estimator is configured to estimate a signal-to-noise ratio based on an output of the equalizer. The controller is configured to control a rate of generation of a notch filter by the equalizer and a rate of adaptation of parameters of one or more of i) the equalizer, ii) the analog front end, and iii) the echo canceller based on the signal-to-noise ratio.

In other features, the controller is further configured to increase the rate of generation of a notch filter by the equalizer and decrease the rate of adaptation of parameters of one or more of i) the equalizer, ii) the analog front end, and iii) the echo canceller in response to the signal-to-noise ratio being less than a predetermined value.

In other features, the parameters include i) a gain of the equalizer, ii) a timing of the analog front end, and iii) coefficients of the echo canceller.

In other features, the transceiver further comprises an error detector and an adaptation module. The error detector is configured to detect when an error in the output of the equalizer due to the electromagnetic interference is greater than or equal to a predetermined threshold. In response to detecting that the error is greater than or equal to the predetermined threshold, the error detector is configured to set an error indicator to indicate no error for a predetermined period of time. The error indicator set to zero for the predetermined period of time indicates that no error has occurred for the predetermined period of time. The adaptation module is configured to adapt the parameters of the one or more of i) the equalizer, ii) the analog front end, and iii) the echo canceller based on the error indicator.

In other features, the controller does not adapt the parameters during the predetermined period of time in response to i) the error being greater than or equal to the predetermined threshold and ii) the error indicator indicating no error.

In other features, the electromagnetic interference includes i) narrowband interference and ii) burst noise. The error is greater than or equal to the predetermined threshold due to the burst noise. The predetermined time period is based on a duration of the burst noise. The predetermined threshold is based on a strength of the burst noise.

In other features, the controller is further configured to i) increase the rate of generation of the notch filter and ii) decrease the rate of adaptation of the parameters in response to the error being less than the predetermined threshold after the predetermined time period.

In other features, the input signal is a combination of i) a first signal received by the receiver via the single twisted-pair Ethernet cable and ii) an echo cancellation signal from the echo canceller associated with the transmitter.

In other features, the equalizer is a feedforward equalizer including a notch filter. The notch filter is a finite impulse response filter. A number of taps of the notch filter is based on a frequency of the electromagnetic interference to be mitigated.

In other features, the transceiver further comprises a decision feedback equalizer, a slicer, and a forward error correcting decoder. The decision feedback equalizer includes an infinite impulse response filter configured to receive the output of the equalizer. The slicer is configured to slice an output of the decision feedback equalizer. The forward error correcting decoder is configured to decode the output of the slicer.

In still other features, a method for communicating in a vehicle using a transceiver, where the transceiver including a transmitter and a receiver to respectively transmit and receive signals via a single twisted-pair Ethernet cable, comprises receiving, at an equalizer, an input signal received by the transceiver via the single twisted-pair Ethernet cable to cancel electromagnetic interference from the input signal. The input signal includes outputs of i) an analog front end of the receiver and ii) an echo canceller. The echo canceller is configured to cancel echo from the transmitter. The transmitter is collocated with the receiver. The method further comprises adapting parameters of one or more of the i) equalizer, ii) the analog front end, and iii) the echo canceller based on an error in an output of the equalizer due to the electromagnetic interference. The method further comprises detecting when the error is greater than or equal to a predetermined threshold. The method further comprises setting, in response to detecting that the error is greater than or equal to the predetermined threshold, an error indicator to indicate no error for a predetermined period of time. The error indicator set to zero for the predetermined period of time indicates that no error has occurred for the predetermined period of time. The method further comprises controlling adaptation of the parameters of the one or more of i) the equalizer, ii) the analog front end, and iii) the echo canceller based on the error indicator.

In other features, the method further comprises not adapting the parameters during the predetermined period of time in response to i) the error being greater than or equal to the predetermined threshold and ii) the error indicator indicating no error.

In other features, the parameters include i) a gain of the equalizer, ii) a timing of the analog front end, and iii) coefficients of the echo canceller.

In other features, the electromagnetic interference includes i) narrowband interference and ii) burst noise. The error is greater than or equal to the predetermined threshold due to the burst noise. The method further comprises selecting the predetermined time period based on a duration of the burst noise, and selecting the predetermined threshold based on a strength of the burst noise.

In other features, the method further comprises generating a notch filter of the equalizer to cancel the electromagnetic interference. The electromagnetic interference includes narrowband interference. The method further comprises estimating a signal-to-noise ratio based on the output of the equalizer, and controlling a rate of generation of the notch filter by the equalizer based on the signal-to-noise ratio.

In other features, the rate of generating the notch filter is inversely related to the signal-to-noise ratio.

In other features, the method further comprises increasing the rate of generation of the notch filter in response to the signal-to-noise ratio being less than or equal to a predetermined value.

In other features, the method further comprises decreasing a rate of adaptation of the parameters to less than a predetermined rate.

In other features, the method further comprises i) increasing the rate of generation of the notch filter and ii) decrease the rate of adaptation of the parameters in response to the error being less than the predetermined threshold after the predetermined time period.

In other features, the input signal is a combination of i) a first signal received by the receiver via the single twisted-pair Ethernet cable and ii) an echo cancellation signal from the echo canceller associated with the transmitter.

In other features, the equalizer is a feedforward equalizer including a notch filter. The notch filter is a finite impulse response filter. The method further comprises selecting a number of taps of the notch filter based on a frequency of the electromagnetic interference to be mitigated.

In other features, the method further comprises processing the output of the equalizer using a decision feedback equalizer. The decision feedback equalizer includes an infinite impulse response filter. The method further comprises slicing an output of the decision feedback equalizer using a slicer, and decoding an output of the slicer using a forward error correcting decoder.

In still other features, a method for communicating in a vehicle using a transceiver, where the transceiver including a transmitter and a receiver to respectively to transmit and receive signals via a single twisted-pair Ethernet cable, comprises receiving, at an equalizer, an input signal received by the transceiver via the single twisted-pair Ethernet cable to cancel electromagnetic interference from the input signal. The input signal includes outputs of i) an analog front end of the receiver and ii) an echo canceller. The echo canceller is configured to cancel echo from the transmitter. The transmitter is collocated with the receiver. The method further comprises estimating a signal-to-noise ratio based on an output of the equalizer. The method further comprises controlling a rate of generation of a notch filter by the equalizer and a rate of adaptation of parameters of one or more of i) the equalizer, ii) the analog front end, and iii) the echo canceller based on the signal-to-noise ratio.

In other features, the method further comprises increasing the rate of generation of a notch filter by the equalizer and decreasing the rate of adaptation of parameters of one or more of i) the equalizer, ii) the analog front end, and iii) the echo canceller in response to the signal-to-noise ratio being less than a predetermined value.

In other features, the parameters include i) a gain of the equalizer, ii) a timing of the analog front end, and iii) coefficients of the echo canceller.

In other features, the method further comprises detecting when an error in the output of the equalizer due to the electromagnetic interference is greater than or equal to a predetermined threshold. The method further comprises setting, in response to detecting that the error is greater than or equal to the predetermined threshold, an error indicator to indicate no error for a predetermined period of time. The error indicator set to zero for the predetermined period of time indicates that no error has occurred for the predetermined period of time. The method further comprises adapting the parameters of the one or more of i) the equalizer, ii) the analog front end, and iii) the echo canceller based on the error indicator.

In other features, the method further comprises not adapting the parameters during the predetermined period of time in response to i) the error being greater than or equal to the predetermined threshold and ii) the error indicator indicating no error.

In other features, the electromagnetic interference includes i) narrowband interference and ii) burst noise. The error is greater than or equal to the predetermined threshold due to the burst noise. The method further comprises selecting the predetermined time period based on a duration of the burst noise, and selecting the predetermined threshold based on a strength of the burst noise.

In other features, the method further comprises i) increasing the rate of generation of the notch filter and ii) decreasing the rate of adaptation of the parameters in response to the error being less than the predetermined threshold after the predetermined time period.

In other features, the input signal is a combination of i) a first signal received by the receiver via the single twisted-pair Ethernet cable and ii) an echo cancellation signal from the echo canceller associated with the transmitter.

In other features, the equalizer is a feedforward equalizer including a notch filter. The notch filter is a finite impulse response filter. The method further comprises selecting a number of taps of the notch filter based on a frequency of the electromagnetic interference to be mitigated.

In other features, the method further comprises processing the output of the equalizer using a decision feedback equalizer. The decision feedback equalizer includes an infinite impulse response filter. The method further comprises slicing an output of the decision feedback equalizer using a slicer, and decoding an output of the slicer using a forward error correcting decoder.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

The Institute of Electrical and Electronics Engineers (IEEE) draft standards 802.3 bp/D3.0 (1000BASE-T1) and 802.3bw/D3.3 (100BASE-T1) govern single twisted-pair-based communication systems designed to operate in automotive and industrial environments. The entire disclosures of these draft standards are incorporated herein by reference.

In single twisted-pair-based communication systems designed to operate in automotive and industrial environments, the symbol rate can be as high as 750M symbols/s. Achieving the symbol rate of 750M symbols/s over a single twisted-pair in noisy environments can be challenging. Accordingly, the present disclosure relates to systems and method for quickly and reliably mitigating electromagnetic interference (EMI) in single twisted-pair-based communication systems designed to operate in automotive and industrial environments. The EMI includes narrowband interference (NBI) and burst noise.

Specifically, the systems and methods of the present disclosure utilize equalizers, which are typically used to equalize communication channels, for a different purpose: to mitigate EMI. The systems and methods of the present disclosure dynamically adapt notch filters used by the equalizers to effectively reduce response time to EMI and improve signal-to-noise ratio (SNR) when EMI is mitigated.

More specifically, the systems and methods speed up adaptation of the equalizers when NBI occurs to reduce transition time and slow down the adaptation to minimize adaptation noise when there is no NBI or NBI is cancelled. Also, when NBI is large (e.g., exceeds a threshold), NBI interferes with various control loops of the receiver, which include a Digital Timing Loop (DTL) controlling an analog front end of the receiver, a Gain Loop (GL) controlling equalizer gain, a DC Loop (DCL) controlling DC offset control performed by the equalizers, and an Echo Cancellation Loop (ECL) controlling an echo canceller. Accordingly, when NBI is large, the various control loops of the receiver including the DTL, GL, and ECL are slowed down to reduce the impact of the NBI on these loops. The systems and methods of the present disclosure use the following two approaches to mitigate EMI. Each approach can be used alone or in conjunction with the other.

In a first approach, the impact of burst noise on the various loops is minimized as follows. When error due to burst noise in the data output by a slicer in the equalizers exceeds a threshold, an error indicator indicating the error is deliberately set to zero, indicating no error in the data output by the slicer. The error indicator is set to zero for a number of continuous data processing cycles (i.e., for a predetermined period of time). Setting the error indicator to zero for a predetermined period of time when the error due to burst noise exceeds a threshold stops or disables (i.e., prevents) adaptation of one or more of the various loops and allows the burst noise to dissipate within the predetermined period time. After the predetermined period of time, the burst noise having dissipated, the adaptation resumes or begins to mitigate NBI. This avoids adaptation that may be unnecessary due to the transient nature of burst noise.

In a second approach, the SNR is monitored. If the SNR is low, the rate of adaptation of the equalizers (i.e., rates at which the equalizers generate notch filters and/or rates of adjusting tap values of the notch filters) is increased to minimize the impact of NBI. Additionally, the rate of adaptation of one or more of the various loops is reduced to minimize the impact of NBI.

In some implementations, the first approach and the second approach can be combined and used together. When the first approach and the second approach are combined and used together, the impact of NBI can be initially reduced using the first approach since NBI can generate large errors for a long time, and then the SNR-based adaptation can be performed using the second approach. These and other aspects of the systems and methods of the present disclosure are described below in detail.

Figure 1A:
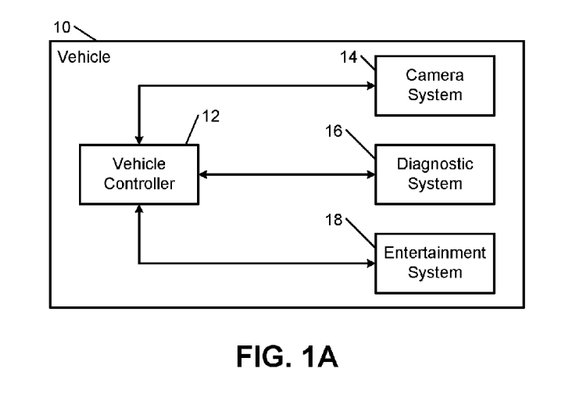
FIGS. 1A-1C show a non-limiting example of a single twisted-pair-based Ethernet communication system designed for use in a vehicle.
Figure 1B:
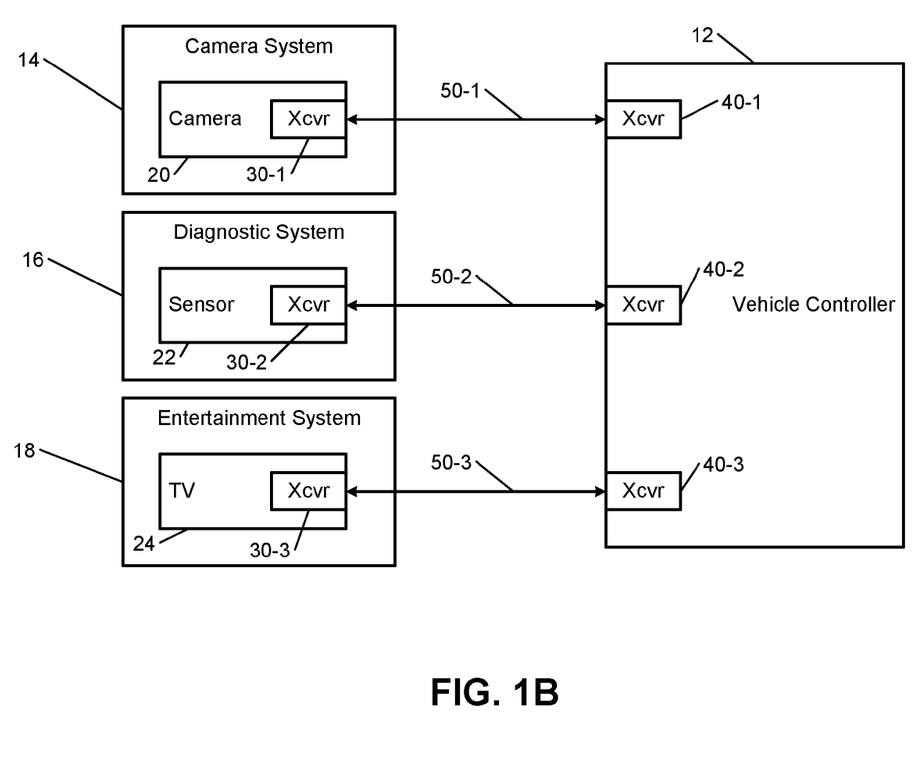
Figure 1C:
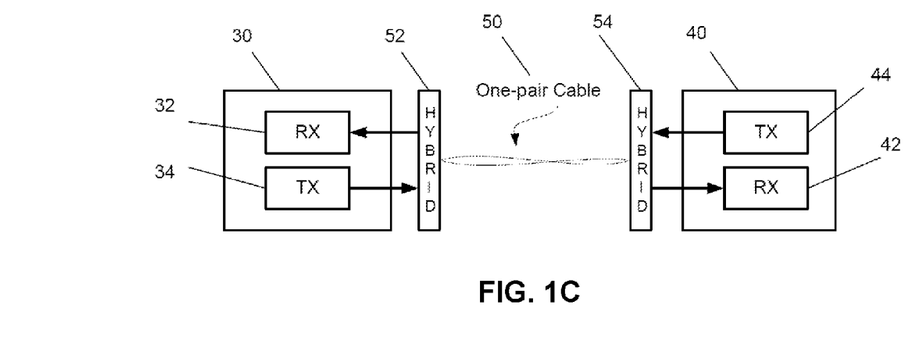

FIGS. 1A-1C show a non-limiting example of a single twisted-pair-based Ethernet communication system designed for use in a vehicle 10. For example only, the vehicle 10 can include an automobile, a boat, and so on. In FIG. 1A, the vehicle 10 includes a vehicle controller 12 that communicates with a plurality of systems including, for example, a camera system 14, a diagnostic system 16, and an entertainment system 18. While not shown, the vehicle 10 can include additional systems such as a communication system that can communicate with the device and/or a network external to the vehicle 10. The vehicle controller 12 can also control these additional systems.

The camera system 14 can include one or more cameras that are installed in the vehicle 10 to assist, for example, in backing up the vehicle 10, in parking the vehicle 10, in maintaining a desired distance between the vehicle 10 and a vehicle ahead of the vehicle 10 while driving, and/or in maintaining a lane while driving. The vehicle controller 12 can receive data from the one or more cameras of the camera system 14 and can control the operation of the vehicle 10, including providing alerts or warnings to the occupants of the vehicle 10, based on the data received from the camera system 14.

The diagnostic system 16 can include, for example, one or more sensors installed in the vehicle 10 to sense events and/or conditions associated with the vehicle 10. For example, a sensor can sense tire pressure on a flat tire, ambient temperature, temperature inside the vehicle 10, road conditions, whether the doors and/or windows are open and/or closed, seat positions, and so on. The vehicle controller 12 can receive data from one or more sensors of the diagnostic system 16 and can control the operation of the vehicle 10, including providing alerts or warnings to the occupants of the vehicle 10, based on the data received from the diagnostic system 16.

The entertainment system 18 can include, for example, one or more multimedia devices such as televisions that can be disposed at different locations in the vehicle 10. The vehicle controller 12 can control the distribution of multimedia content to the occupants of the vehicle 10 through the entertainment system 18.

In FIG. 1B, each of the devices of the plurality of systems (e.g., a camera, a sensor, a television, and so on) includes a transceiver that communicates with a corresponding transceiver the vehicle controller 12 via a single twisted-pair Ethernet cable. For example, the camera system 14 can include a camera 20 and a transceiver 30-1 that communicates with a transceiver 40-1 of the vehicle controller 12 via a single twisted-pair Ethernet cable 50-1. For example, the diagnostic system 16 can include a sensor 22 and a transceiver 30-2 that communicates with a transceiver 40-2 of the vehicle controller 12 via a single twisted-pair Ethernet cable 50-2. For example, the entertainment system 18 can include a television 24 and a transceiver 30-3 that communicates with a transceiver 40-3 of the vehicle controller 12 via a single twisted-pair Ethernet cable 50-3.

In FIG. 1C, a transceiver 30 (e.g., transceiver 30-1, 30-2, 30-3) of a device (e.g., a camera, a sensor, a television) of the plurality of systems (e.g., systems 14, 16, 18) communicates with a transceiver 40 (e.g., transceiver 40-1, 40-2, 40-3) of the vehicle controller 12 via a single twisted-pair Ethernet cable 50 (e.g., 50-1, 50-2, 50-3). For example, the transceiver 30 includes a transmitter 32 and a receiver 34, and the transceiver 40 includes a transmitter 42 and a receiver 44. The single twisted-pair Ethernet cable 50 connects to the transceiver 30 via a first hybrid 52 and to the transceiver 40 via a second hybrid 54 as shown.

The transmitter 32 of the transceiver 30 of a device (e.g., a camera, a sensor, a television) of the plurality of systems (e.g., systems 14, 16, 18) transmits signals via the first hybrid 52 and the single twisted-pair Ethernet cable 50 to the transceiver 40 of the vehicle controller 12. The receiver 44 of the transceiver 40 of the vehicle controller 12 receives the signals transmitted by the transmitter 32 of the transceiver 30 of the device via the single twisted-pair Ethernet cable 50 and the second hybrid 54.

The transmitter 42 of the transceiver 40 of the vehicle controller 12 transmits signals via the second hybrid 54 and the single twisted-pair Ethernet cable 50 to the transceiver 30 of the device (e.g., a camera, a sensor, a television) of the plurality of systems (e.g., systems 14, 16, 18). The receiver 34 of the transceiver 30 of the device receives the signals transmitted by the transmitter 42 of the transceiver 40 of the vehicle controller 12 via the single twisted-pair Ethernet cable 50 and the first hybrid 52.

Figure 2:
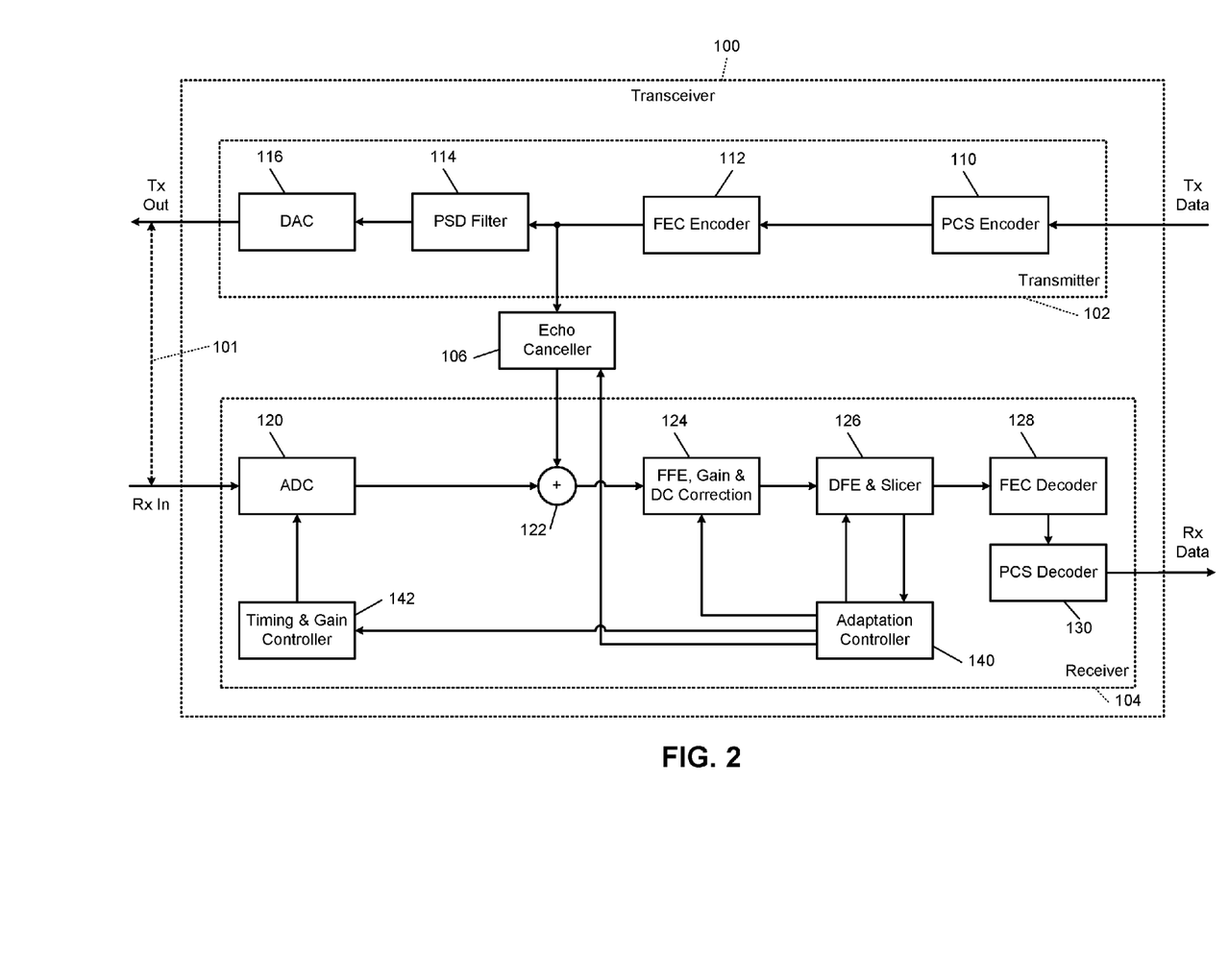
FIG. 2 is a functional block diagram of a digital signal processing (DSP) system of a transceiver designed for use in a single twisted-pair-based Ethernet communication system in automotive and industrial environments according to the present disclosure.

FIG. 2 shows a digital signal processing (DSP) system of a transceiver 100 designed for use in a single twisted-pair-based Ethernet communication system in automotive and industrial environments according to the present disclosure. The transceiver 100 supports a symbol rate of 750M symbols/s over a single twisted-pair and mitigates EMI (including narrowband interference (NBI) and burst noise). The transceiver 100 supports the IEEE 802.3 bp/D3.0 (1000BASE-T1) and 802.3bw/D3.3 (100BASE-T1) standards. The transceiver 100 shares the IEEE physical coding sublayer (PCS) command set for 1000 MBps and 100 MBps modes. The transceiver 100 uses 3-level pulse amplitude modulation (PAM3) signaling.

The transceiver 100 includes a transmitter 102, a receiver 104, and an echo canceller 106. The transmitter 102 transmits data via a first hybrid (not shown) and a single twisted-pair cable 101. The receiver 104 receives data via a second hybrid (not shown) and the single twisted-pair cable 101.

The transceiver 100 is similar to the transceivers 30 and 40 shown in FIG. 1C. The transmitter 102 is similar to the transmitters 32 and 42 shown in FIG. 1C. The receiver 104 is similar to the receivers 34 and 44 shown in FIG. 1C. The single twisted-pair cable 101 is similar to the single twisted-pair Ethernet cable 50 shown in FIG. 1C. The first and second hybrids are similar to the first and second hybrids 42 and 54 shown in FIG. 1C.

The transmitter 102 includes a PCS encoder 110, a forward error correction (FEC) encoder 112, a power spectral density (PSD) filter 114, and a digital-to-analog converter (DAC) 116. The PCS encoder 110 encodes data to be transmitted. The FEC encoder 112 encodes the output of the PCS encoder 110 using codes such as Reed-Solomon codes with or without configurable erasure to handle EMI as well as EMI cancellation. The PSD filter 114 performs shaping and emission control based on the output of the FEC encoder 112. The DAC 116 converts the output of the PSD filter 114 into analog signals that are transmitted via the single twisted-pair cable 101.

The echo canceller 106 receives the output of the FEC encoder 112 and generates an echo cancellation signal. The echo cancellation signal is used by the receiver 104 to cancel any echo that may be present in the signals received by the receiver 104 via the single twisted-pair cable 101 due to the signals transmitted by the transmitter 102 via the single twisted-pair cable 101.

The receiver 104 includes an analog-to-digital converter (ADC) 120, a combiner 122, a feed-forward equalizer (FFE) 124, a decision feedback equalizer (DFE) 126, a FEC decoder 128, a PCS decoder 130, an adaptation controller 140, and a timing and gain controller 142. The FFE 124 also includes a gain adjuster, a DC offset correction block, and a baseline wandering (BLW) correction block. The DFE 126 also includes a slicer.

The ADC 120 receives signals from the single twisted-pair cable 101 and converts the signals from analog to digital format. The timing and gain controller 142 controls the sampling phase of the ADC 120 based on the error in the data output by the slicer in the DFE 126. The timing and gain controller 142 also controls the timing and gain of the ADC 120 under the control of the adaptation controller 140. The combiner 122 combines the output of the ADC 120 and the output of the echo canceller 106 and outputs an echo cancelled signal.

The FFE 124 receives the output of the combiner 122. The FFE 124 mitigates EMI from the signal received from the combiner 122 as explained below. The FFE 124 also includes a gain adjuster that adjusts the gain of the signal received from the combiner 122. The FFE 124 also includes an offset correction block (not shown) that corrects DC offset in the signal received from the combiner 122. The receiver 104 (e.g., the FFE 124) also includes a baseline wandering (BLW) correction block (not shown) that performs baseline wandering correction on the signal received from the combiner 122.

The DFE 126 receives the output of the FFE 124 and further mitigates EMI as explained below. The DFE 126 also includes a slicer that slices the signal received from the FFE 124 and processed by the DFE 126. A slicer or dipper is a device designed to prevent an output of a circuit from exceeding a predetermined voltage level without distorting the remainder of the waveform. A slicer is used to select a part of a signal waveform that lies above or below a predetermined reference voltage level. Thus a slicer can remove some portions of a waveform near the positive or negative peaks. The slicer outputs bits of data that represent the data received by the receiver 104 via the single twisted-pair cable 101. The FEC decoder 128 decodes the data output by the slicer using codes such as Reed-Solomon codes. The PCS decoder 130 decodes the output of the FEC decoder 128 and outputs data received by the receiver 104 that is free of EMI at 750M symbols/s.

The adaptation controller 140 controls various aspects (e.g., parameters including gain, timing, coefficients, and tap values) of the FFE 124, DFE 126, echo canceller 106, and ADC 120 to mitigate EMI as follows. The FFE 124 and the DFE 126 generate notch filters to filter EMI. The FFE 124 uses a finite impulse response (FIR) filter as notch filter. The DFE 126 uses an infinite impulse response (IIR) filter as notch filter. The adaptation controller 140 controls the rate at which one or both of the FFE 124 and the DFE 126 generate the respective notch filters. The adaptation controller 140 also controls the tap values of one or both of the notch filters. The number of taps of the notch filters is determined by the interference frequency to be mitigated.

The receiver 104 uses leaky FFE 124 and leaky DFE 126 to improve convergence (i.e., minimization of error) and stability of the FFE 124 and DFE 126. Leakage of an equalizer means rate of adaptation of the equalizer (e.g., rate of generation of a notch filter of the equalizer, and/or rate of change of tap values of the notch filter). Leakage control is performed by the adaptation controller 140 for one or both of the FFE 124 and DFE 126.

Figure 3:
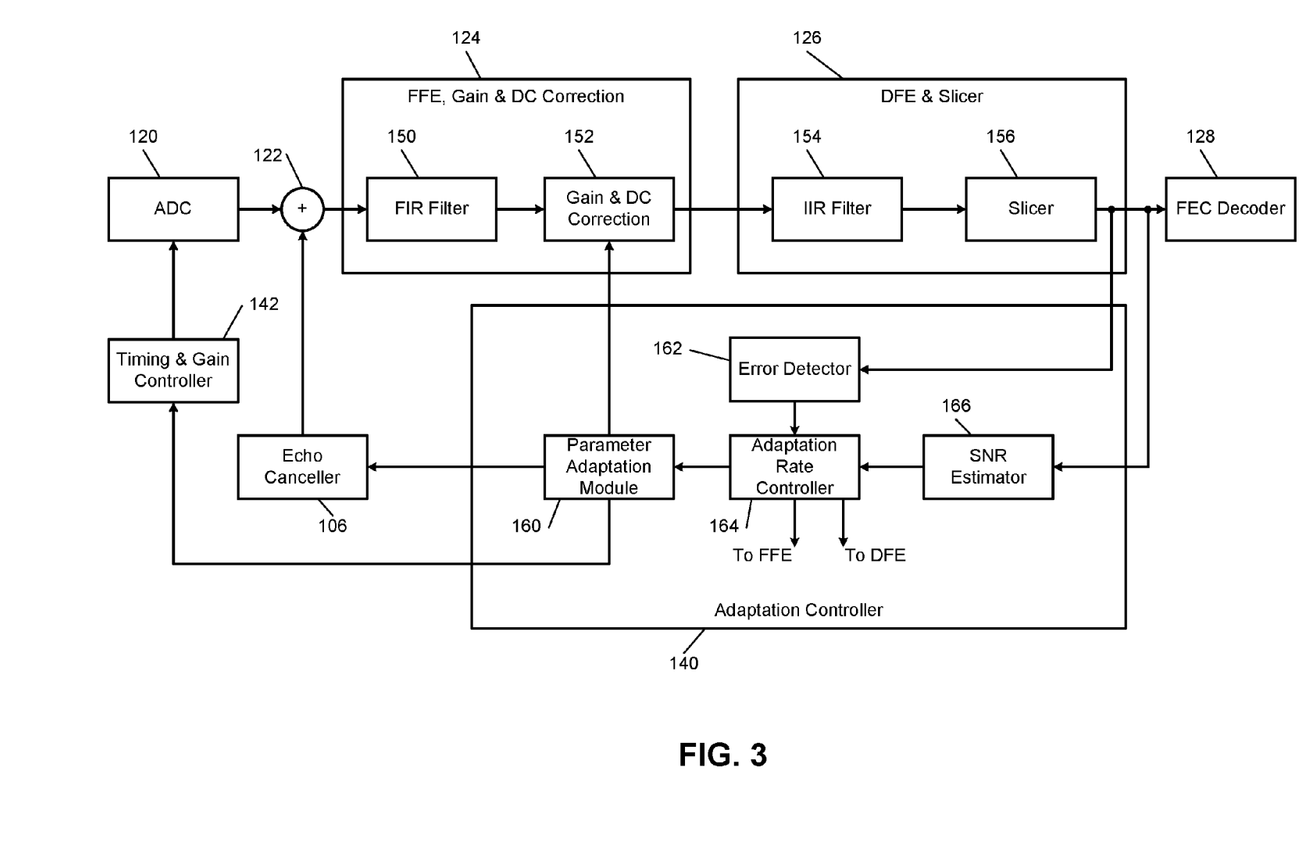
FIG. 3 shows equalizers and an adaptation controller of the transceiver of FIG. 2 in one embodiment.

FIG. 3 shows the FFE 124, the DFE 126, and the adaptation controller 140 in one embodiment. The FFE 124 includes an FIR filter 150 and a gain and DC correction block 152. The DFE 126 includes an IIR filter 154 and a slicer 156. The adaptation controller 140 includes a parameter adaptation module 160, an error detector 162, an adaptation rate controller 164, and an SNR estimator 166.

The FIR filter 150 receives an input signal from the combiner 122. The input signal is a combination of a first signal received by the receiver 104 via the single twisted-pair cable 101 and an echo cancellation signal from the transmitter 102 transmitting signals via the single twisted-pair cable 101. The FIR filter 150 outputs a filtered signal to the gain and DC correction block 152. The gain and DC correction block 152 adjusts the gain and corrects a DC offset in the filtered signal. While not shown, a BLW correction block performs baseline wandering correction on the signal received from the combiner 122. The IIR filter 154 further filters the signal received from the FFE 124. The slicer 156 slices the output of the IIR filter 154 and outputs bits of digital data to the FEC decoder 128.

The parameter adaptation module 160 adapts parameters of one or more of the FFE 124, the ADC 120, and the echo canceller 106 based on an error detected in the output of the slicer 156, the SNR, or both (i.e., based on the error alone, based on the SNR alone, or based on both the error and the SNR (i.e., the error and/or the SNR). The error detector 162 detects the error in the output of the slicer 156. The SNR estimator 166 estimates the SNR. The adaptation rate controller 164 controls the rate of adaptation of the parameters and the rate of adaptation of the FFE 124 and the DFE 126 based on the error and/or the SNR as follows.

An equalizer (e.g., the FFE 124) receives an input signal and cancels electromagnetic interference (EMI) from the input signal. The EMI includes narrowband interference and burst noise. The input signal includes outputs of the analog front end of the receiver 104 (e.g., the ADC 120) and of the echo canceller 106. The echo canceller 106 cancels echo in the signal received by the receiver 104 due to a signal transmitted from the transmitter 102 collocated with the receiver 104.

The parameter adaptation module 160 adapts parameters of one or more of the equalizer (e.g., the FFE 124), the analog front-end of the receiver 104 (e.g., the ADC 120), and the echo canceller 106 based on the error in the output of the equalizer (e.g., the output of the slicer 156) due to the EMI. Alternatively or additionally, the parameter adaptation module 160 adapts parameters of one or more of the equalizer (e.g., the FFE 124), the analog front-end of the receiver 104 (e.g., the ADC 120), and the echo canceller 106 based on the SNR. The parameters include a gain of the equalizer (e.g., the FFE 124), a timing of the analog front end of the receiver 104 (e.g., the ADC 120), and coefficients of the echo canceller 106.

In a first approach to mitigate the EMI, the error detector 162 detects when the error in the output of the equalizer (e.g., in the output of the slicer 156) due to the EMI (e.g., due to the burst noise) is greater than or equal to a predetermined threshold. The error detector 162 sets an error indicator to indicate no error (i.e., sets the error indicator to zero or resets the error indicator) for a number of continuous processing cycles (i.e., for a predetermined period of time) when the error in the output of the equalizer (e.g., in the output of the slicer 156) due to the EMI is greater than or equal to the predetermined threshold. The predetermined time period is based on the duration of the burst noise. The predetermined threshold is based on the signal strength (e.g., the amplitude or magnitude) of the burst noise.

The adaptation controller 140 controls the adaptation of the parameters of the one or more of the equalizer (e.g., the FFE 124), the analog front end of the receiver 104 (e.g., the ADC 120), and the echo canceller 106 based on the error indicator performed by the parameter adaptation module 160. The parameter adaptation module 160 does not adapt the parameters (i.e., stops, suspends, or disables the adaptation of the parameters) during the predetermined period of time in response to the error in the output of the equalizer (e.g., in the output of the slicer 156) due to the EMI being greater than or equal to the predetermined threshold and the error indicator indicating no error in the output of the equalizer (e.g., in the output of the slicer 156) due to the EMI. This allows the burst noise to dissipate during the predetermined period of time and avoids unnecessary adaptation that could disturb the signal processing.

In a second approach to mitigate the EMI, which can be implemented independently of or in addition to the first approach, the equalizer (e.g., the FFE 124) generates a notch filter (i.e., the FIR filter 150) to cancel the EMI including narrowband interference. The SNR estimator 166 estimates the SNR based on the output of the equalizer (e.g., the output of the slicer 156). The adaptation rate controller 164 controls a rate of generation of the notch filter (i.e., the FIR filter 150) by the equalizer (e.g., the FFE 124) based on the SNR. For example, the rate of generating the notch filter is inversely related to the SNR.

Specifically, the adaptation rate controller 164 increases the rate of generation of the notch filter (i.e., the FIR filter 150) in response to the SNR being less than or equal to a predetermined value due to EMI. Additionally, the adaptation rate controller 164 decreases the rate of adaptation of the one or more of the parameters to less than a predetermined rate in response to the SNR being less than or equal to the predetermined value due to the EMI. When used in conjunction with the first approach, the adaptation rate controller 164 increases the rate of generation of the notch filter and decreases the rate of adaptation of the one or more of the parameters in response to the error in the output of the equalizer (e.g., in the output of the slicer 156) being greater than zero and less than the predetermined threshold after the predetermined time period.

Figure 4:
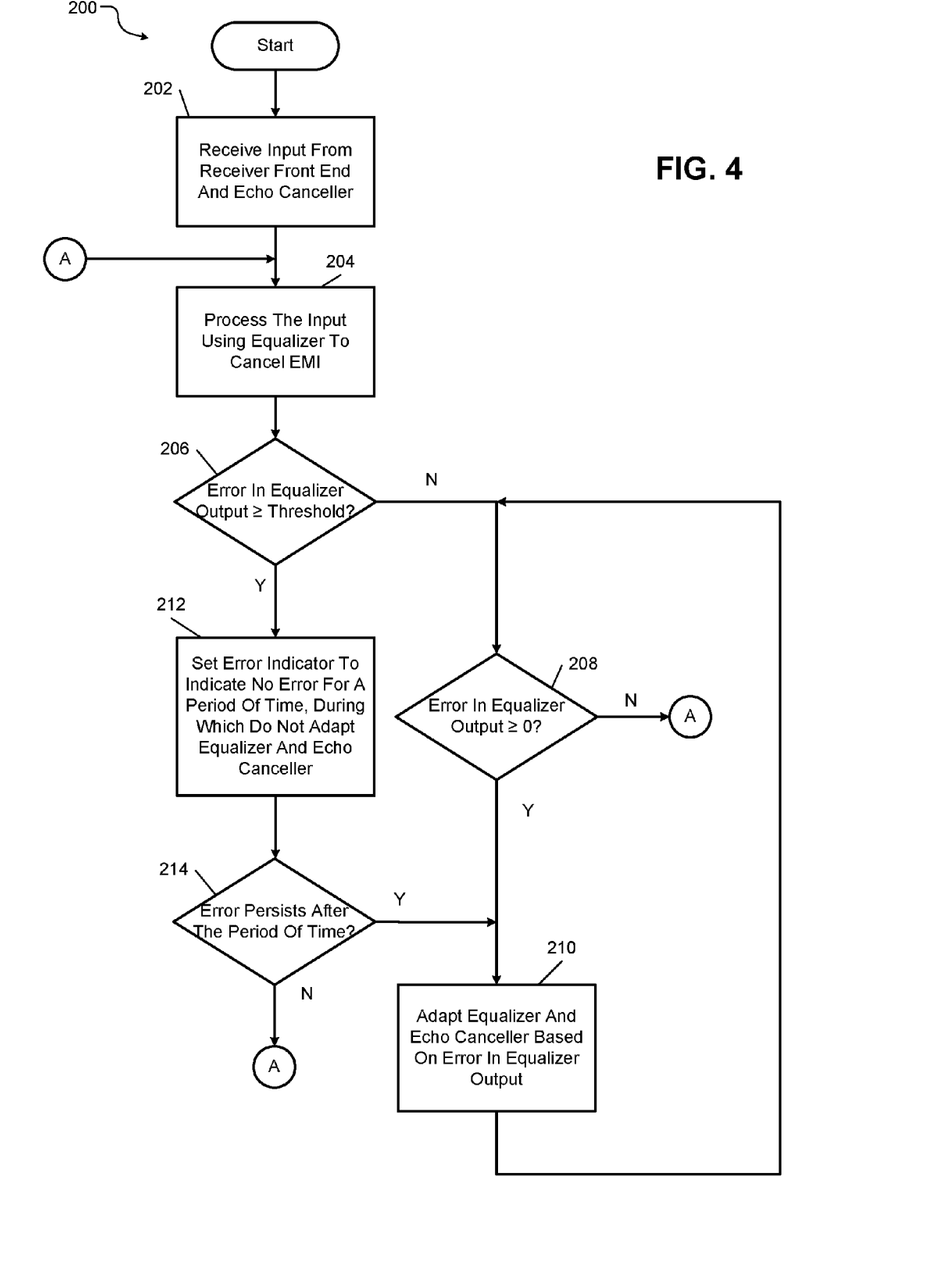
FIG. 4 is a flowchart of a first method for mitigating EMI using a first approach according to the present disclosure.

FIG. 4 shows a method 200 for mitigating EMI using the first approach according to one embodiment. For example, the method 200 can be performed by the transceiver 100 shown in FIG. 2. At 202, control (e.g., the FFE 124 and the DFE 126 shown in FIGS. 2 and 3) receives an input from an analog front end of a receiver and an echo canceller. At 204, control processes the input using an equalizer to cancel EMI in the input. At 206, control (e.g., the adaptation controller 140 and the error detector 162 shown in FIGS. 2 and 3) determines whether an error in an output of the equalizer is greater than or equal to a predetermined threshold. At 208, if the error in the output of the equalizer is less than the predetermined threshold, control determines if the error in the output of the equalizer is greater than or equal to 0. Control returns to 204 if there is no error in the output of the equalizer. At 210, if the error in the output of the equalizer is greater than or equal to 0, control (e.g., the adaptation controller 140 and the parameter adaptation module 160 shown in FIGS. 2 and 3) adapts one or more of the equalizer, the analog front end of the receiver, and the echo canceller based on the error, and control returns to 208.

At 212, if the error in the output of the equalizer is greater than or equal to the predetermined threshold, control (e.g., the adaptation controller 140 and the error detector 162 shown in FIGS. 2 and 3) sets an error indicator to indicate that there is no error in the output of the equalizer for a predetermined time period, during which control (e.g., the adaptation controller 140 and the parameter adaptation module 160 shown in FIGS. 2 and 3) does not adapt the equalizer, the analog front end of the receiver, and the echo canceller based on the error. At 214, control (e.g., the adaptation controller 140 and the error detector 162 shown in FIGS. 2 and 3) determines if an error still exists in the output of the equalizer after the predetermined time period has elapsed. Control returns to 204 if no error exists in the output of the equalizer after the predetermined time period has elapsed. Control returns to 210 if an error still exists in the output of the equalizer after the predetermined time period has elapsed.

Figure 5:
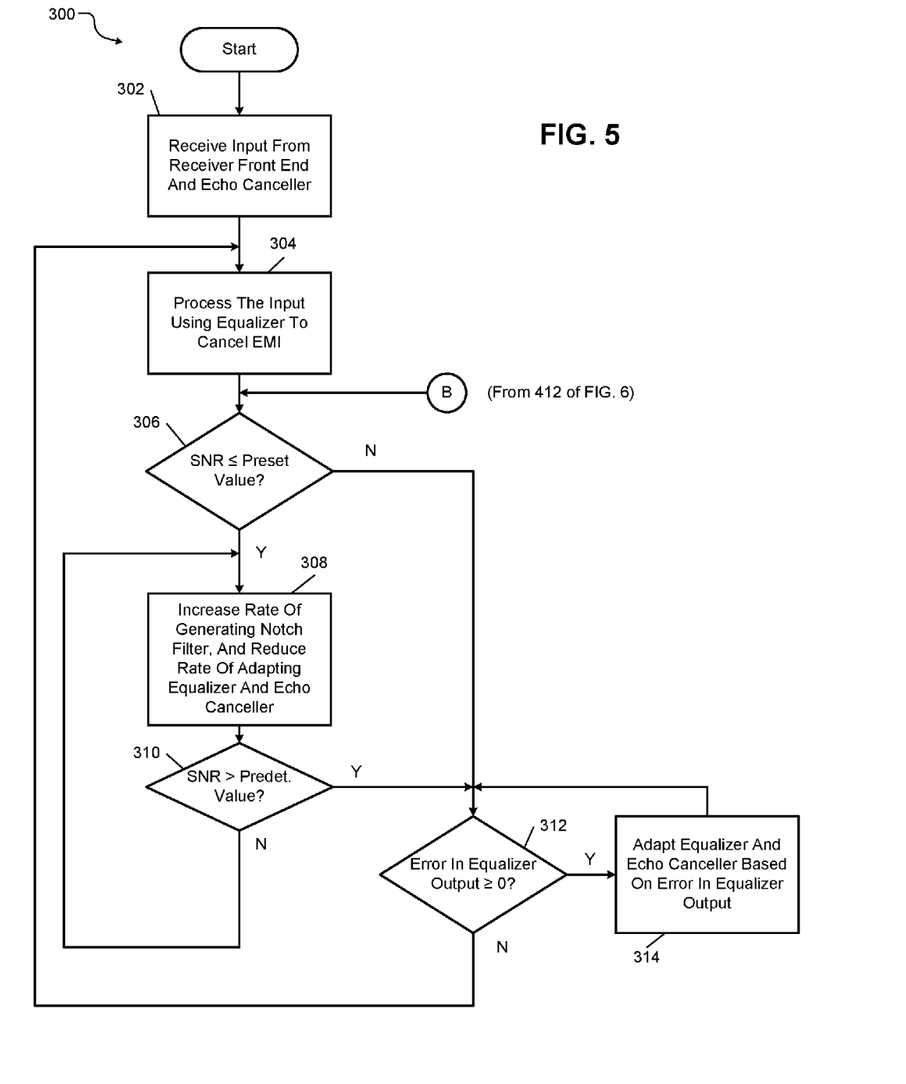
FIG. 5 is a flowchart of a second method for mitigating EMI using a second approach according to the present disclosure.

FIG. 5 shows a method 300 for mitigating EMI using the second approach according to an embodiment. For example, the method 200 can be performed by the transceiver 100 shown in FIG. 2. At 302, control (e.g., the FFE 124 and the DFE 126 shown in FIGS. 2 and 3) receives an input from an analog front end of a receiver and an echo canceller. At 304, control processes the input using an equalizer to cancel EMI in the input. At 306, control (e.g., the adaptation controller 140 and the SNR estimator 166 shown in FIGS. 2 and 3) determines whether an SNR at an output of the equalizer is less than or equal to a predetermined value. At 308, if the SNR is less than the predetermined value, control (e.g., the adaptation controller 140 and the adaptation rate controller 164 shown in FIGS. 2 and 3) increases a rate at which the equalizer generates a notch filter and reduces a rate at which one or more of the equalizer, the analog front end of the receiver, and an echo canceller are adapted. At 310, control (e.g., the adaptation controller 140 and the SNR estimator 166 shown in FIGS. 2 and 3) determines if the SNR is greater than the predetermined value. Control returns to 308 if the SNR is not greater than the predetermined value.

At 312, if the SNR is greater than the predetermined value at 306 or 310, control (e.g., the adaptation controller 140 and the error detector 162 shown in FIGS. 2 and 3) determines if an error in the output of the equalizer is greater than or equal to 0. Control returns to 304 if there is no error in the output of the equalizer at 306 or if there is no error in the output of the equalizer after the predetermined time period has elapsed at 310. At 314, if the error is greater than or equal to 0 at 312, control (e.g., the adaptation controller 140 and the parameter adaptation module 160 shown in FIGS. 2 and 3) adapts one or more of the equalizer, the analog front end of the receiver, and the echo canceller based on the error, and control returns to 312.

Figure 6:
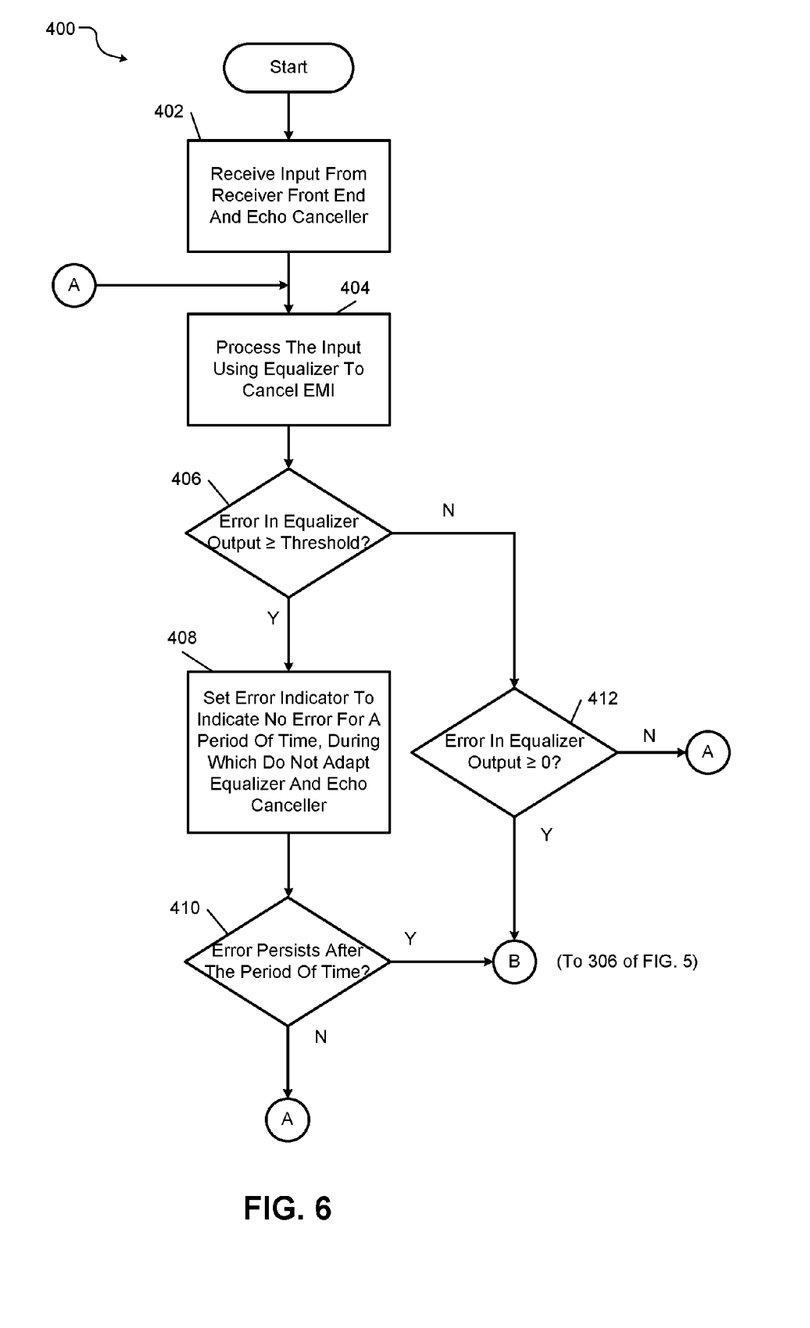
FIG. 6 is a flowchart of a method for mitigating EMI using a combination of the first approach (i.e., the first method) and the second approach (i.e., the second method) according to the present disclosure.

FIG. 6 shows an example of a method 400 for mitigating EMI using a combination of the first approach (i.e., the method 200) and the second approach (i.e., the method 300) according to the present disclosure. For example, the method 200 can be performed by the transceiver 100 shown in FIG. 2. At 402, control (e.g., the FFE 124 and the DFE 126 shown in FIGS. 2 and 3) receives an input from an analog front end of the receiver and an echo canceller. At 404, control processes the input using an equalizer to cancel EMI in the input. At 406, control (e.g., the adaptation controller 140 and the error detector 162 shown in FIGS. 2 and 3) determines whether an error in an output of the equalizer is greater than or equal to a predetermined threshold. At 408, if the error in the output of the equalizer is greater than or equal to the predetermined threshold, control sets an error indicator to indicate that there is no error in the output of the equalizer for a predetermined time period, during which control (e.g., the adaptation controller 140 and the parameter adaptation module 160 shown in FIGS. 2 and 3) does not adapt the equalizer, the analog front end of the receiver, and the echo canceller based on the error. At 410, control (e.g., the adaptation controller 140 and the error detector 162 shown in FIGS. 2 and 3) determines if an error still exists in the output of the equalizer after the predetermined time period has elapsed. Control returns to 404 if no error exists in the output of the equalizer after the predetermined time period has elapsed.

At 412, if the error in the output of the equalizer is less than the predetermined threshold at 406 or if an error still exists in the output of the equalizer after the predetermined time period has elapsed at 410, control determines if the error in the output of the equalizer is greater than or equal to 0. Control returns to 404 if there is no error in the output of the equalizer at 412. Control executes steps starting at 306 as shown in FIG. 5 and as described with reference to FIG. 5 if the error in the output of the equalizer is greater than or equal to 0 at 412.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A transceiver to communicate in a vehicle via a single twisted-pair Ethernet cable, the transceiver including a transmitter to transmit signals via the single twisted-pair Ethernet cable and a receiver to receive signals via the single twisted-pair Ethernet cable, the transceiver comprising:
    an equalizer to receive an input signal received by the transceiver via the single twisted-pair Ethernet cable and to cancel electromagnetic interference from the input signal, the input signal including outputs of i) an analog front end of the receiver and ii) an echo canceller, wherein the echo canceller is to cancel echo from the transmitter, and wherein the transmitter is collocated with the receiver;
    an adaptation circuit to adapt parameters of one or more of i) the equalizer, ii) the analog front end, and iii) the echo canceller based on an error in an output of the equalizer due to the electromagnetic interference;
    an error detector to detect when the error is greater than or equal to a predetermined threshold and in response to detecting that the error is greater than or equal to the predetermined threshold, the error detector is to set an error indicator to indicate no error for a predetermined period of time, wherein the error indicator set to zero for the predetermined period of time indicates that no error has occurred for the predetermined period of time; and
    a controller to control adaptation of the parameters of the one or more of i) the equalizer, ii) the analog front end, and iii) the echo canceller based on the error indicator.

2. The transceiver of claim 1, wherein the controller does not adapt the parameters during the predetermined period of time in response to i) the error being greater than or equal to the predetermined threshold and ii) the error indicator indicating no error.

3. The transceiver of claim 1, wherein the parameters include i) a gain of the equalizer, ii) a timing of the analog front end, and iii) coefficients of the echo canceller.

4. The transceiver of claim 1, wherein:
the electromagnetic interference includes i) narrowband interference and ii) burst noise;
the error is greater than or equal to the predetermined threshold due to the burst noise;
the predetermined time period is based on a duration of the burst noise; and
the predetermined threshold is based on a strength of the burst noise.

5. The transceiver of claim 1, wherein the equalizer is further to generate a notch filter to cancel the electromagnetic interference, the electromagnetic interference including narrowband interference, the transceiver further comprising:
a signal-to-noise ratio estimator to estimate a signal-to-noise ratio based on the output of the equalizer,
wherein the controller is further to control a rate of generation of the notch filter by the equalizer based on the signal-to-noise ratio.

6. The transceiver of claim 5, wherein the rate of generating the notch filter is inversely related to the signal-to-noise ratio.

7. The transceiver of claim 5, wherein the controller is further to increase the rate of generation of the notch filter in response to the signal-to-noise ratio being less than or equal to a predetermined value.

8. The transceiver of claim 7, wherein the controller is further to decrease a rate of adaptation of the parameters to less than a predetermined rate.

9. The transceiver of claim 8, wherein the controller is further to i) increase the rate of generation of the notch filter and ii) decrease the rate of adaptation of the parameters in response to the error being less than the predetermined threshold after the predetermined time period.

10. The transceiver of claim 1, wherein the input signal is a combination of i) a first signal received by the receiver via the single twisted-pair Ethernet cable and ii) an echo cancellation signal from the echo canceller associated with the transmitter.

11. The transceiver of claim 1, wherein:
the equalizer is a feedforward equalizer including a notch filter;
the notch filter is a finite impulse response filter; and
a number of taps of the notch filter is based on a frequency of the electromagnetic interference to be mitigated.

12. The transceiver of claim 1, further comprising:
a decision feedback equalizer including an infinite impulse response filter to receive the output of the equalizer;
a slicer to slice an output of the decision feedback equalizer; and
a forward error correcting decoder to decode an output of the slicer.

13. A method for communicating in a vehicle using a transceiver, the transceiver including a transmitter and a receiver to respectively transmit and receive signals via a single twisted-pair Ethernet cable, the method comprising:
receiving, at an equalizer, an input signal received by the transceiver via the single twisted-pair Ethernet cable to cancel electromagnetic interference from the input signal, the input signal including outputs of i) an analog front end of the receiver and ii) an echo canceller, wherein the echo canceller is to cancel echo from the transmitter, and wherein the transmitter is collocated with the receiver;
adapting parameters of one or more of the i) equalizer, ii) the analog front end, and iii) the echo canceller based on an error in an output of the equalizer due to the electromagnetic interference;
detecting when the error is greater than or equal to a predetermined threshold;
setting, in response to detecting that the error is greater than or equal to the predetermined threshold, an error indicator to indicate no error for a predetermined period of time, wherein the error indicator set to zero for the predetermined period of time indicates that no error has occurred for the predetermined period of time; and
controlling adaptation of the parameters of the one or more of i) the equalizer, ii) the analog front end, and iii) the echo canceller based on the error indicator.

14. The method of claim 13, further comprising not adapting the parameters during the predetermined period of time in response to i) the error being greater than or equal to the predetermined threshold and ii) the error indicator indicating no error.

15. The method of claim 13, wherein the parameters include i) a gain of the equalizer, ii) a timing of the analog front end, and iii) coefficients of the echo canceller.

16. The method of claim 13, wherein the electromagnetic interference includes i) narrowband interference and ii) burst noise, and wherein the error is greater than or equal to the predetermined threshold due to the burst noise, the method further comprising:
selecting the predetermined time period based on a duration of the burst noise; and
selecting the predetermined threshold based on a strength of the burst noise.

17. The method of claim 13, further comprising:
generating a notch filter of the equalizer to cancel the electromagnetic interference, wherein the electromagnetic interference includes narrowband interference;
estimating a signal-to-noise ratio based on the output of the equalizer; and
controlling a rate of generation of the notch filter by the equalizer based on the signal-to-noise ratio.

18. The method of claim 17, wherein the rate of generating the notch filter is inversely related to the signal-to-noise ratio.

19. The method of claim 17, further comprising increasing the rate of generation of the notch filter in response to the signal-to-noise ratio being less than or equal to a predetermined value.

20. The method of claim 19, further comprising decreasing a rate of adaptation of the parameters to less than a predetermined rate.

21. The method of claim 20, further comprising i) increasing the rate of generation of the notch filter and ii) decrease the rate of adaptation of the parameters in response to the error being less than the predetermined threshold after the predetermined time period.

22. The method of claim 13, wherein the input signal is a combination of i) a first signal received by the receiver via the single twisted-pair Ethernet cable and ii) an echo cancellation signal from the echo canceller associated with the transmitter.

23. The method of claim 13, wherein the equalizer is a feedforward equalizer including a notch filter, and wherein the notch filter is a finite impulse response filter, the method further comprising selecting a number of taps of the notch filter based on a frequency of the electromagnetic interference to be mitigated.

24. The method of claim 13, further comprising:
processing the output of the equalizer using a decision feedback equalizer, the decision feedback equalizer including an infinite impulse response filter;
slicing an output of the decision feedback equalizer using a slicer; and
decoding an output of the slicer using a forward error correcting decoder.

\* \* \* \* \*